United States Patent
Nguyen et al.

(10) Patent No.: US 10,802,934 B2
(45) Date of Patent: Oct. 13, 2020

(54) SYSTEMS AND METHODS TO PREVENT SYSTEM CRASHES DUE TO LINK FAILURE IN MEMORY MIRRORING MODE

(71) Applicant: Dell Products L.P., Round Rock, TX (US)

(72) Inventors: Tuyet-Huong Thi Nguyen, Cedar Park, TX (US); David Keith Chalfant, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 148 days.

(21) Appl. No.: 16/004,996

(22) Filed: Jun. 11, 2018

(65) Prior Publication Data
US 2019/0377650 A1    Dec. 12, 2019

(51) Int. Cl.
| | |
|---|---|
| *G06F 11/00* | (2006.01) |
| *G06F 11/20* | (2006.01) |
| *G06F 3/06* | (2006.01) |
| *G06F 13/16* | (2006.01) |
| *G06F 13/24* | (2006.01) |

(52) U.S. Cl.
CPC .......... *G06F 11/2069* (2013.01); *G06F 3/065* (2013.01); *G06F 3/0619* (2013.01); *G06F 3/0673* (2013.01); *G06F 11/2087* (2013.01); *G06F 13/1668* (2013.01); *G06F 13/24* (2013.01); *G06F 2201/805* (2013.01); *G06F 2201/82* (2013.01)

(58) Field of Classification Search
CPC ............. G06F 11/2069; G06F 11/2087; G06F 11/2053; G06F 11/2056; G06F 11/2094; G06F 3/0619; G06F 3/065; G06F 3/0673; G06F 3/0614; G06F 3/0674; G06F 13/1668; G06F 13/24; G06F 13/32; G06F 13/362; G06F 2201/805; G06F 2201/82
See application file for complete search history.

(56) References Cited

U.S. PATENT DOCUMENTS

| | | | |
|---|---|---|---|
| 2008/0162991 A1* | 7/2008 | Dell | G06F 11/1012 714/25 |
| 2009/0164837 A1* | 6/2009 | Swanson | G06F 11/1666 714/6.2 |
| 2013/0151767 A1* | 6/2013 | Berke | G06F 11/167 711/105 |
| 2017/0344414 A1* | 11/2017 | Raj | G06F 11/0772 |

* cited by examiner

*Primary Examiner* — Anthony J Amoroso
(74) *Attorney, Agent, or Firm* — Baker Botts L.L.P.

(57) ABSTRACT

Systems and methods for preventing system crashes due to memory link failure in memory mirroring mode in an information handling system (IHS). The IHS may include a first memory device, a second memory device, and an integrated memory controller (IMC). The IMC may issue write transactions to both the first and second memory devices and issue read transactions to the first memory device when the IMC is in memory mirroring mode. The IMC may transmit a system management interrupt (SMI) with an IMC error to a basic input/output system (BIOS) when a persistent uncorrected IMC error is detected within the first memory device. The BIOS may perform a memory mirror failover process that may cause the IMC to issue the write transactions and the read transactions to the second memory device when the IMC error is a fatal memory link error.

14 Claims, 4 Drawing Sheets

400 — METHOD TO PREVENT SYSTEM CRASHES DUE TO MEMORY LINK FAILURE IN MEMORY MIRRORING MODE

ISSUING, BY AN INTEGRATED MEMORY CONTROLLER (IMC) OF AN INFORMATION HANDLING SYSTEM (IHS), WRITE TRANSACTIONS TO BOTH A FIRST MEMORY DEVICE AND A SECOND MEMORY DEVICE OF THE IHS WHEN THE IMC IS IN MEMORY MIRRORING MODE — 402

ISSUING, BY THE IMC, READ TRANSACTIONS TO THE FIRST MEMORY DEVICE WHEN THE IMC IS IN MEMORY MIRRORING MODE — 404

TRANSMITTING, BY THE IMC, A SYSTEM MANAGEMENT INTERRUPT (SMI) WITH AN IMC ERROR TO A BASIC INPUT/OUTPUT SYSTEM (BIOS) OF THE IHS WHEN A PERSISTENT UNCORRECTED IMC ERROR IS DETECTED WITHIN THE FIRST MEMORY DEVICE — 406

RECEIVING, BY THE BIOS, THE SMI WITH THE IMC ERROR FROM THE IMC — 408

PERFORMING, BY THE BIOS, A MEMORY MIRROR FAILOVER PROCESS THAT MAY CAUSE THE IMC TO ISSUE ALL OF THE WRITE TRANSACTIONS AND THE READ TRANSACTIONS TO THE SECOND MEMORY DEVICE WHEN THE IMC ERROR IS A FATAL MEMORY LINK ERROR AND THE IMC IS IN MEMORY MIRRORING MODE — 410

FIG. 4

SYSTEMS AND METHODS TO PREVENT SYSTEM CRASHES DUE TO LINK FAILURE IN MEMORY MIRRORING MODE

BACKGROUND

Field of the Disclosure

This disclosure relates generally to information handling systems and, more particularly, to systems and methods to prevent system crashes due to link failure in memory mirroring mode.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, a disclosed information handling system may include a first memory device, a second memory device, and a processor. The processor may include an integrated memory controller (IMC). The IMC may issue write transactions to both the first memory device and the second memory device when the IMC is in memory mirroring mode. The IMC may also issue read transactions to the first memory device when the IMC is in memory mirroring mode. The IMC may further transmit a system management interrupt (SMI) with an IMC error to a basic input/output system (BIOS) when a persistent uncorrected IMC error is detected within the first memory device. The IMC may also include a processor that may execute the BIOS. The BIOS may receive the SMI with the IMC error from the IMC. The BIOS may also perform a memory mirror failover process that may cause the IMC to issue the write transactions and the read transactions to the second memory device when the IMC error is a fatal memory link error and the IMC is in memory mirroring mode.

In a number of the disclosed embodiments of the information handling system, the BIOS may, when the IMC error is a fatal memory link error and the IMC is in memory mirroring mode, transmit a system control interrupt (SCI) with a memory mirror redundancy lost event to an operating system (OS) of the IHS.

In a number of the disclosed embodiments of the information handling system, the BIOS may, when the IMC error is a fatal memory link error and the IMC is not in memory mirroring mode, transmit a machine check error (MCE) interrupt with an uncorrectable error to an OS of the IHS.

In a number of the disclosed embodiments of the information handling system, the memory mirror failover process may also cause the IMC to quiesce any outstanding write and read transactions to the first memory device.

In a number of the disclosed embodiments of the information handling system, the first memory device and the second memory device may comprise dual in-line memory modules (DIMMs).

In a number of the disclosed embodiments of the information handling system, the information handling system may also include a first memory channel coupled between the IMC and the first memory device and a second memory channel coupled between the IMC and the second memory device.

In a number of the disclosed embodiments of the information handling system, the information handling system may also include a first memory channel coupled between the IMC and the first memory device and a second memory channel coupled between the IMC and the second memory device. The IMC may communicate with the first memory channel via a first double data rate/double data rate transactional (DDR/DDRT) link. The IMC may also communicate with the second memory channel via a second DDR/DDRT link.

In a number of the disclosed embodiments of the information handling system, the memory mirror redundancy lost event may comprise information that describes which DIMM of the first memory device is associated with the fatal memory link error and is to be replaced.

In a number of the disclosed embodiments of the information handling system, the fatal memory link error may comprise one of a persistent uncorrectable command error or a persistent uncorrectable address error.

In a second embodiment, a disclosed method may include issuing, by an integrated memory controller (IMC) of an information handling system (IHS), write transactions to both a first memory device and a second memory device of the IHS when the IMC is in memory mirroring mode. The method may also include issuing, by the IMC, read transactions to the first memory device when the IMC is in memory mirroring mode. The method may further include transmitting, by the IMC, a system management interrupt (SMI) with an IMC error to a basic input/output system (BIOS) of the IHS when a persistent uncorrected IMC error is detected within the first memory device. The method may also include receiving, by the BIOS, the SMI with the IMC error from the IMC. The method may further include performing, by the BIOS, a memory mirror failover process that may cause the IMC to issue the write transactions and the read transactions to the second memory device when the IMC error is a fatal memory link error and the IMC is in memory mirroring mode.

In a number of the disclosed embodiments of the method, the method may also include, when the IMC error is a fatal memory link error and the IMC is in memory mirroring mode, transmitting, by the BIOS, a system control interrupt (SCI) with a memory mirror redundancy lost event to an operating system (OS) of the IHS.

In a number of the disclosed embodiments of the method, the method may also include, when the IMC error is a fatal memory link error and the IMC is not in memory mirroring mode, transmitting, by the BIOS, a machine check error (MCE) interrupt with an uncorrectable error to an OS of the IHS.

In a number of the disclosed embodiments of the method, the memory mirror failover process may further cause the IMC to quiesce any outstanding write and read transactions to the first memory device.

In a number of the disclosed embodiments of the method, the first memory device and the second memory device may comprise dual in-line memory modules (DIMMs).

In a number of the disclosed embodiments of the method, the information handling system may also include a first memory channel coupled between the IMC and the first memory device and a second memory channel coupled between the IMC and the second memory device.

In a number of the disclosed embodiments of the method, the information handling system may also include a first memory channel coupled between the IMC and the first memory device and a second memory channel coupled between the IMC and the second memory device. The IMC may communicate with the first memory channel via a first double data rate/double data rate transactional (DDR/DDRT) link. The IMC may also communicate with the second memory channel via a second DDR/DDRT link.

In a number of the disclosed embodiments of the method, the memory mirror redundancy lost event may comprise information that describes which DIMM of the first memory device is associated with the fatal memory link error and is to be replaced.

In a number of the disclosed embodiments of the method, the fatal memory link error may comprise one of a persistent uncorrectable command error or a persistent uncorrectable address error.

BRIEF DESCRIPTION OF THE DRAWINGS

For a more complete understanding of the present invention and its features and advantages, reference is now made to the following description, taken in conjunction with the accompanying drawings, in which:

FIG. 4 is a flowchart depicting selected elements of an embodiment of a method for preventing system crashes due to memory link failure in memory mirroring mode.

DESCRIPTION OF PARTICULAR EMBODIMENT(S)

Figure 1:
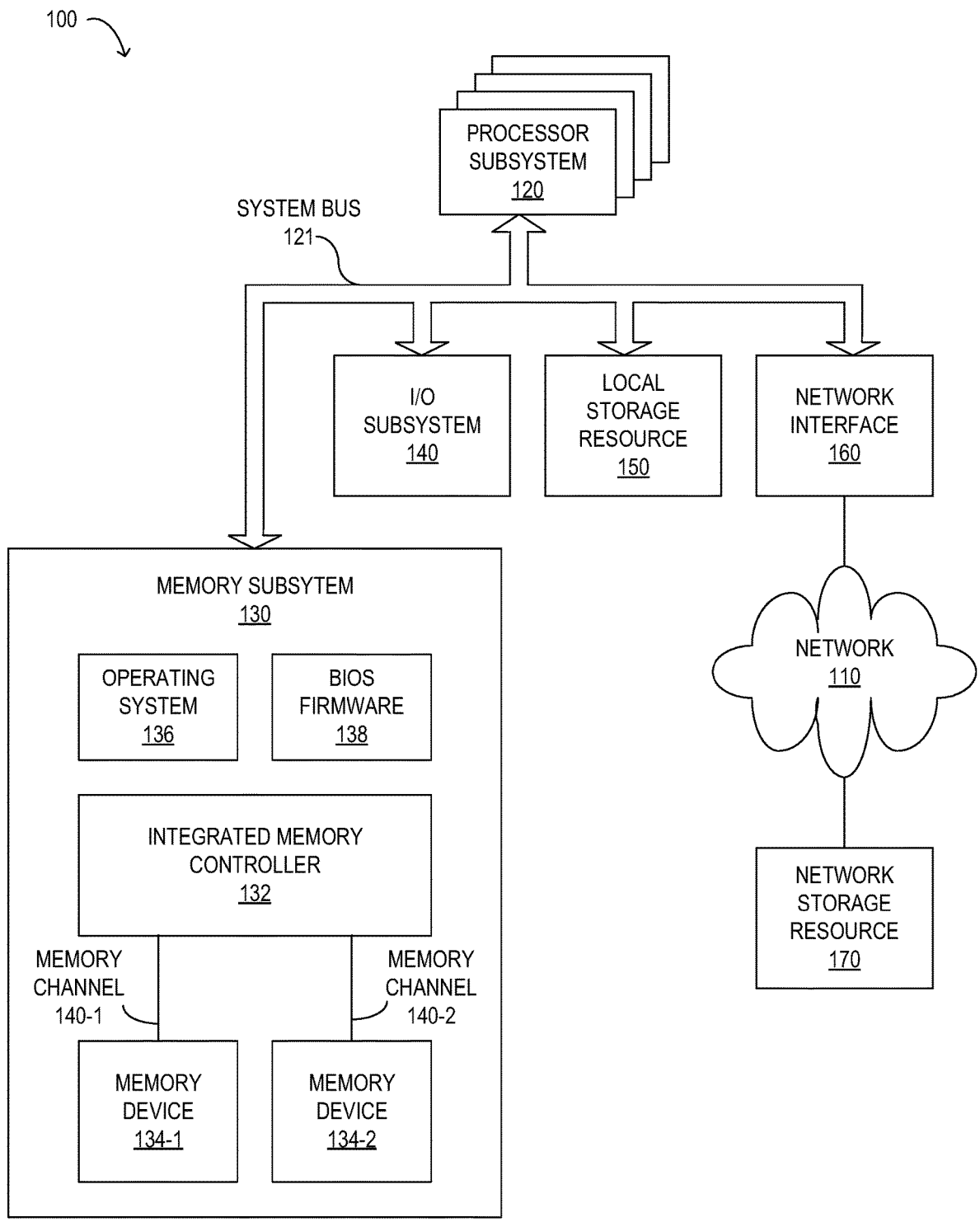
FIG. 1 is a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2A, 2B, 3, and 4 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

As shown in FIG. 1, components of memory subsystem 130 may also include an integrated memory controller 132, memory devices 134 including a memory device 134-1 and a memory device 134-2, and memory channels 140 including a memory channel 140-1 and a memory channel 140-2. Integrated memory controller 132 may be coupled to memory device 134-1 by memory channel 140-1 and memory device 134-2 by memory channel 140-2. Integrated memory controller 132 may communicate with memory device 134-1 using memory channel 140-1 and memory device 134-2 using memory channel 140-2. Integrated memory controller 132 may communicate with memory channels 140-1 and 140-2 through a respective double data rate/double data rate transactional (DDR/DDRT) link.

In some embodiments, each memory device 134 may comprise at least one error-correcting code (ECC) dual in-line memory module (DIMM). The ECC DIMM may comprise a DDR synchronous dynamic random access memory (SDRAM) module including a DDR first generation (DDR1) SDRAM, a DDR second generation (DDR2) SDRAM, a DDR third generation (DDR3) SDRAM, a DDR4 SDRAM, a DDR5 SDRAM, or another type of DDR memory. ECC is a data protection mechanism which recovers single bit errors and some multi-bit errors by accurate detection and correction of corrupted data. As such, the ECC DIMM can detect and correct the most common kinds of internal data corruption.

Integrated memory controller 132 may also incorporate a memory redundancy mechanism, also referred herein as a memory mirror, which improves single system reliability using ECC to protect all data in memory, even uncorrectable multi-bit errors. When integrated memory controller 132 incorporates the memory mirror redundancy mechanism and operates in memory mirroring mode, one of memory devices 134 may be a primary image of the memory and the other memory device 134 may be a secondary/backup image of the memory. For example, memory device 134-1 may be the primary image of the memory and memory device 134-2 may be the secondary image of the memory, which may comprise a copy of the primary image of the memory. When integrated memory controller 132 is in memory mirroring mode, data is written to both images of the memory mirror at the same time, memory device 134-1 and memory device 134-2. As data is read from the primary image of the memory, memory device 134-1, its validity is checked using ECC. If no error is found, the data in the primary image of the memory, memory device 134-1, is used for the read operation. However, if an uncorrectable error is detected in the primary image of the memory, memory device 134-1, the read from the primary image of the memory is retried. If the uncorrectable error remains persistent, the mirrored data location is read from the secondary image of the memory, memory device 134-2.

Memory subsystem 130 may also include an operating system (OS) 136, and a basic input/output system (BIOS) 138 that may reside in system memory of memory subsystem 130. OS 136 may include a machine check exception (MCE) interrupt handler and a system control interrupt (SCI) handler. OS 136 may comprise a Microsoft Windows operating system, a MAC OS X operating system, a Linux operating system, or other type of operating system. BIOS 138 may comprise firmware for various hardware management tasks including performing hardware initialization during the booting process, power-on startup, and providing runtime services for operating systems and programs. BIOS 138 may include a system management interrupt (SMI) handler, which may receive an integrated memory controller error from integrated memory controller 132 and process the integrated memory controller error.

As previously described, a memory subsystem may include a memory controller coupled to two memory devices by a respective memory channel. The memory subsystem may utilize memory mirroring to provide memory redundancy to improve system reliability. Memory mirroring is the mechanism by which a memory channel is mirrored to another memory channel within the memory controller, creating a redundant copy of memory. In memory mirroring mode when a write operation is performed to one copy of memory, another write operation is generated to the mirror target location as well. This guarantees that the mirrored target is always updated with the latest data from the main copy. If an uncorrectable error occurs within the memory of one memory channel, the memory controller switches from that memory channel to the other memory channel without any disruption. Such dynamic (without reboot) failover to the mirrored memory is transparent to the operating system and applications. A "memory mirror redundancy lost" event with field replaceable unit (FRU) isolation may be logged to a system event log, and the user should replace a memory device associated with the uncorrectable error whenever a service is scheduled.

The memory controller communicates with a downstream memory channel through a memory link. When the memory controller encounters an error, it will retry the failing transactions over the memory link in an attempt to correct the error condition. If the error still persists after all retry attempts, then the memory controller will log a fatal memory link failure machine check error, which in turn triggers a system management interrupt (SMI) to a basic input/output system (BIOS) of the information handling system. The BIOS would then transmit a machine check exception (MCE) interrupt to the OS and the system would crash as a result.

As will be described in further detail herein, the inventors of the present disclosure have discovered methods and systems for preventing system crashes due to a memory link failure in memory mirroring mode. This solution provides a way for the BIOS to perform a dynamic memory failover process to the functional mirrored memory channel from the failed memory channel when a fatal memory link failure is detected. This may be accomplished by the BIOS during the handling of the system management interrupt triggered by the detection of a fatal memory link failure in memory mirroring mode. The BIOS may perform the dynamic memory failover process, which will quiesce the failed memory channel and all read and write transactions will be issued to the functional mirrored memory channel. The BIOS may then log a "memory mirror redundancy lost" event and transmit a system control interrupt (SCI) to the OS to notify the OS of the memory failover event instead of generating a machine check exception interrupt to the OS. The information handling system remains operational without any disruption on the remaining, functional memory channel. In this manner, system availability may be maximized, and a user may continue any ongoing work without disruption when a fatal memory link failure occurs in memory mirroring mode. The user can then schedule a planned maintenance cycle to replace the defective memory devices on the failed memory channel at a more convenient time.

Figure 2A:
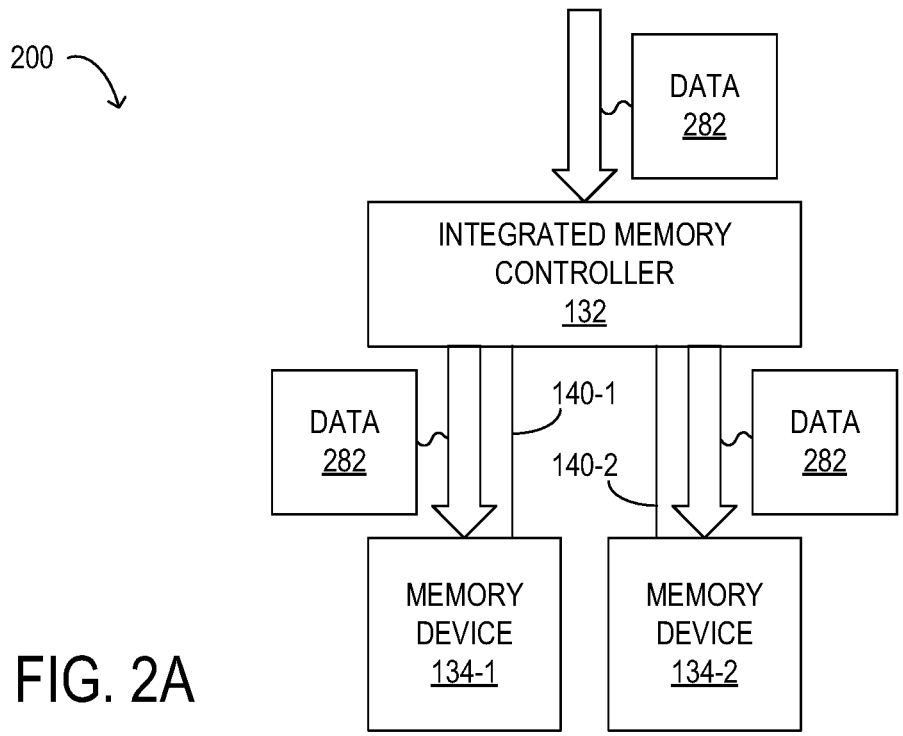
FIGS. 2A and 2B are block diagrams of selected elements of an embodiment of an exemplary integrated memory controller and memory devices in memory mirroring mode.
Figure 2B:
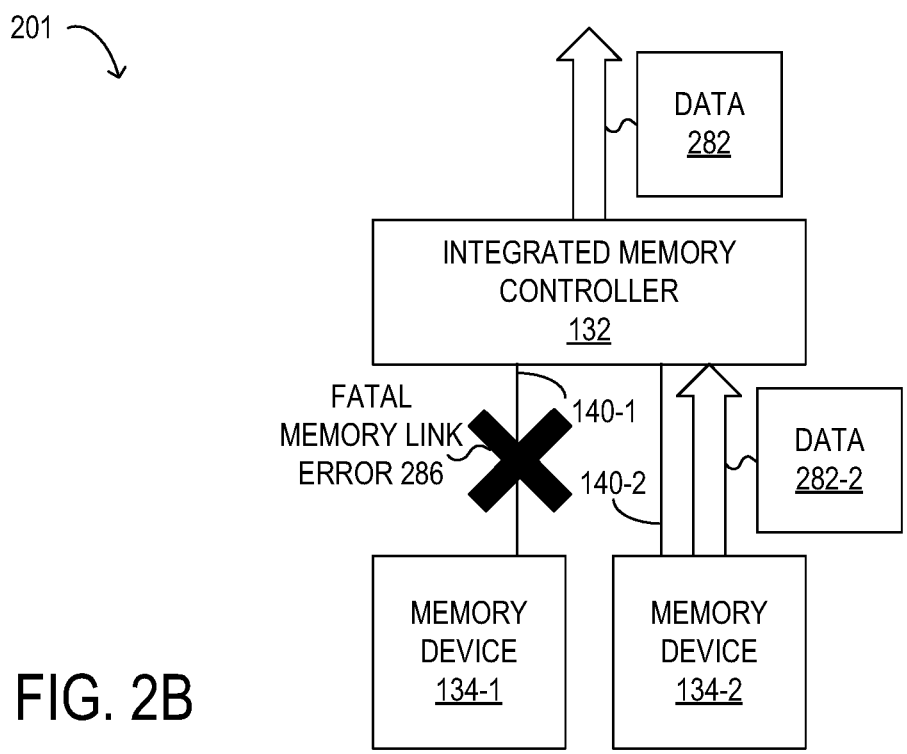

FIGS. 2A and 2B are various examples of integrated memory controller 132 and memory devices 134 in memory mirroring mode operation. In an example 200 of FIG. 2A, integrated memory controller 132 receives a write operation for data 282. In memory mirroring mode, integrated memory controller 132 performs the write transaction for data 282 to a target location of memory of memory device 134-1 using memory channel 140-1 and generates and performs another write transaction for data 282 to the target location of memory of memory device 134-2 using memory channel 140-2. In this manner, the mirrored target location of memory of memory device 134-2 is always updated with the latest data of the main target location of memory of memory device 134-1.

In an example 201 of FIG. 2B, integrated memory controller 132 receives a read operation for data 282. In memory mirroring mode, integrated memory controller 132 performs a read transaction for data 282-1 from the primary image of the memory, memory device 134-1, corresponding to the target location of the read operation for data 282 using memory channel 140-1, which also checks the validity of data 282-1 using ECC. If no error is found, the data in the primary image of the memory, memory device 134-1, is used for the read operation. During the read transaction for data 282-1 from the primary image of the memory, memory device 134-1, integrated memory controller 132 may encounter an uncorrectable error and the read transaction may fail. When the read transaction fails, integrated memory controller 132 may retry the failing read transaction for data 282-1 from the primary image of the memory, memory device 134-1, over the DDR/DDRT link for memory channel 140-1 in an attempt to correct the error condition. During the retry of the read transaction for data 282-1 from the primary image of the memory over the DDR/DDRT link for memory channel 140-1, integrated memory controller 132 may encounter a memory link error. A memory link error may comprise an uncorrectable command error or an uncorrectable address error. If the memory link error persists after all retry attempts, integrated memory controller 132 may log a fatal DDR/DDRT memory link error, such as fatal memory link error 286, and transmit a SMI to BIOS 138. A fatal memory link error may comprise a persistent uncorrectable command error or a persistent uncorrectable address error, or a combination thereof. During handling of the SMI triggered by the detection of fatal memory link error 286 in memory mirroring mode, the SMI handler of BIOS 138 may perform a dynamic memory failover process, which will quiesce the failed memory channel 140-1 and all read and write transactions will be issued to the functional mirrored memory channel 140-2. The SMI handler of BIOS 138 may then log a memory mirror redundancy lost event and transmit a SCI to OS 136 to notify OS 136 of the memory failover event. Integrated memory controller 132 may then read data 282-2 from the secondary image of the memory, memory device 134-2, and use read data 282-2 for the read operation for data 282.

Figure 3:
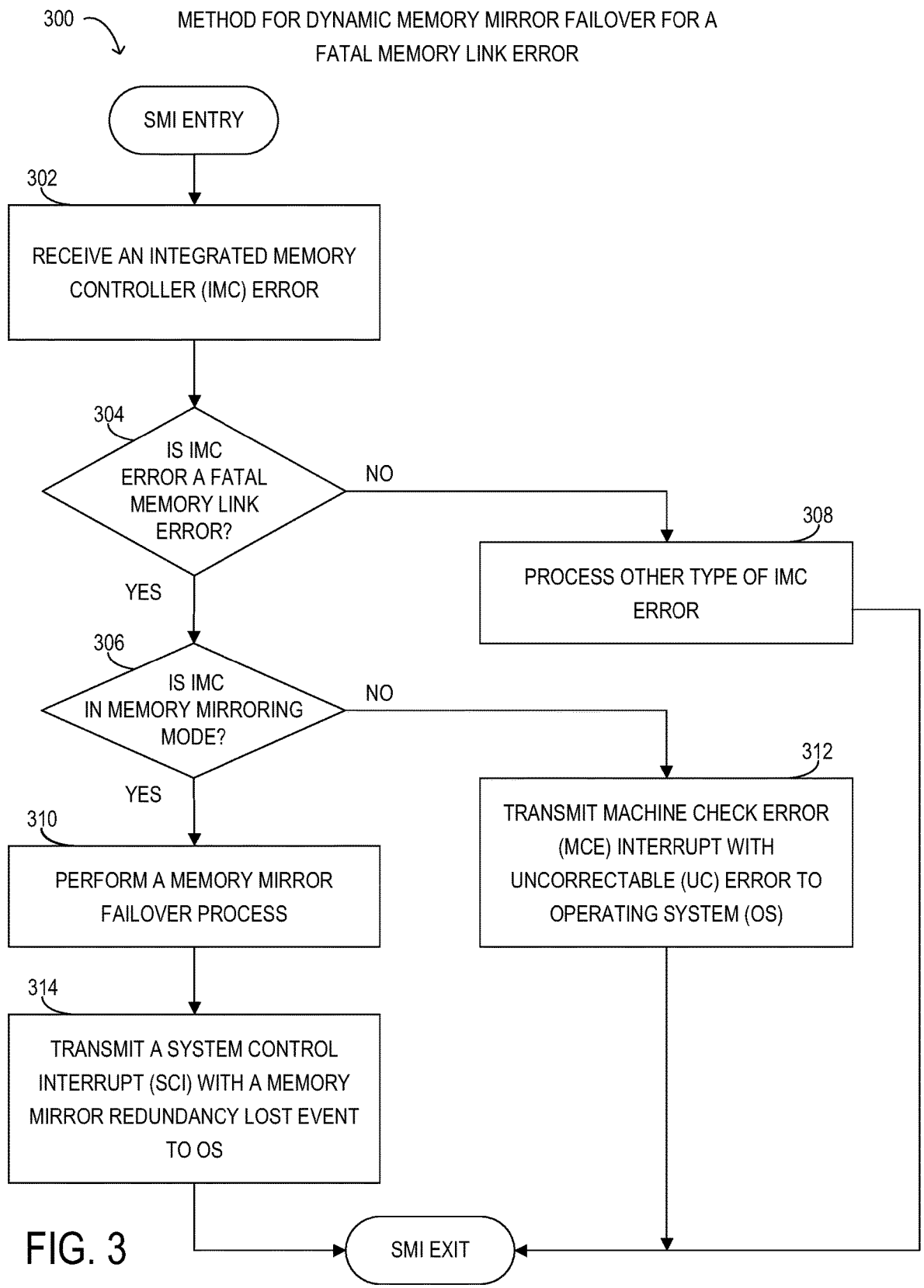
FIG. 3 is a flowchart depicting selected elements of an embodiment of a method for dynamic memory mirror failover for a fatal memory link error.

FIG. 3 is a flowchart depicting selected elements of an embodiment of a method for dynamic memory mirror failover for a fatal memory link error. Method 300 may be performed by an integrated memory controller 132 and a BIOS 138 of information handling system 100 previously described with reference to FIG. 1. It is noted that certain operations described in method 300 may be optional or may be rearranged in different embodiments.

Method 300 may begin at step 302. At step 302, a SMI handler of the BIOS may receive a SMI interrupt with an integrated memory controller error from an integrated memory controller. The SMI handler may also receive the integrated memory controller error with the SMI interrupt. Alternatively, the SMI handler may access the integrated memory controller error from an integrated memory controller error log maintained by the integrated memory controller. At step 304, the SMI handler may determine whether the integrated memory controller error is a fatal memory link error. When the SMI handler determines that the integrated memory controller error is the fatal memory link error, method 300 may proceed to step 306. When the SMI handler determines that the integrated memory controller error is not the fatal memory link error and is another type of integrated memory controller error, method 300 may proceed to step 308. At step 306, the SMI handler may determine whether the integrated memory controller is in memory mirroring mode. When the SMI handler determines that the integrated memory controller is in memory mirroring mode, method 300 may proceed to step 310. Otherwise, method 300 may proceed to step 312. At step 308, the SMI handler may process the other type of integrated memory controller error. Once the other type of integrated memory controller error is processed, the SMI handler may exit and method 300 may end. As step 310, the SMI handler may perform a dynamic memory failover process. The integrated memory controller may be coupled to a first memory device via a first memory channel and a second memory device via a second memory channel. The fatal memory link error indicates that the first memory channel has failed. The dynamic memory failover process may quiesce the failed first memory channel used by the integrated memory controller and all read and write transactions will be issued to the functional second memory channel for the second memory device. The memory failover process may cause the integrated memory controller to switch from using the first memory channel for transactions for the first memory device as a primary memory to using the second memory channel for transactions for the second memory device as the primary memory and cause the integrated memory controller to discontinue using the first memory channel and the first memory device. The memory failover process may also cause the integrated memory controller to switch from memory mirroring mode to normal mode or non-memory mirroring mode. At step 312, the SMI handler may transmit a MCE interrupt with an uncorrectable error to the OS to notify the OS that the fatal memory link error is an uncorrectable error. At step 314, the SMI handler may transmit a system control interrupt with a memory redundancy lost event to the OS to notify the OS of the memory failover event.

FIG. 4 is flowchart depicting selected elements of an embodiment of a method for. Method 400 may be performed by information handling system 100 previously described with reference to FIG. 1. It is noted that certain operations described in method 400 may be optional or may be rearranged in different embodiments.

Method 400 may begin at step 402, by issuing, by an integrated memory controller (IMC) of an information handling system (IHS), write transactions to both a first memory device and a second memory device of the IHS when the IMC is in memory mirroring mode. At step 404, issuing, by the IMC, read transactions to the first memory device when the IMC is in memory mirroring mode. At step 406, transmitting, by the IMC, a system management interrupt (SMI) with an IMC error to a basic input/output system (BIOS) of the IHS when a persistent uncorrected IMC error is detected within the first memory device. At step 408, receiving, by the BIOS, the SMI with the IMC error from the IMC. At step 410, performing, by the BIOS, a memory mirror failover process that may cause the IMC to issue the write transactions and the read transactions to the second memory device when the IMC error is a fatal memory link error and the IMC is in memory mirroring mode. After step 410, method 400 may end.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system (IHS), comprising:
   a first memory device;
   a second memory device; and
   a processor including an integrated memory controller (IMC), the IMC configured to:
   issue write transactions to both the first memory device and the second memory device when the IMC is in memory mirroring mode;
   issue read transactions to the first memory device when the IMC is in memory mirroring mode; and
   transmit a system management interrupt (SMI) with an IMC error to a basic input/output system (BIOS) when a persistent uncorrected IMC error is detected within the first memory device, the processor configured to execute the BIOS to:
receive the SMI with the IMC error from the IMC;
determine whether i) the IMC is in the memory mirroring mode and ii) the IMC error is a fatal memory link error;
in response to determining that i) the IMC is not in the memory mirroring mode and ii) the IMC error is a fatal memory link error, transmit a machine check error (MCE) interrupt with an uncorrectable error to an operating system (OS) of the IHS;
in response to determining that i) the IMC is in the memory mirroring mode and ii) the IMC error is a fatal memory link error: a) perform a memory mirror failover process to cause the IMC to issue the write transactions and the read transactions to the second memory device, and b) transmit a system control interrupt (SCI) with a memory redundancy lost event to the OS of the IHS independent of transmitting the MCE interrupt to the OS of the HIS.

2. The information handling system of claim 1, wherein the memory mirror failover process to further cause the IMC to quiesce any outstanding write and read transactions to the first memory device.

3. The information handling system of claim 1, wherein the first memory device and the second memory device comprise dual in-line memory modules (DIMMs).

4. The information handling system of claim 1, wherein the information handling system further comprises:
a first memory channel coupled between the IMC and the first memory device; and
a second memory channel coupled between the IMC and the second memory device.

5. The information handling system of claim 1, wherein the information handling system further comprises:
a first memory channel coupled between the IMC and the first memory device; and
a second memory channel coupled between the IMC and the second memory device, wherein
the IMC communicates with the first memory channel via a first double data rate/double data rate transactional (DDR/DDRT) link, and wherein
the IMC communicates with the second memory channel via a second DDR/DDRT link.

6. The information handling system of claim 1, wherein the memory mirror redundancy lost event comprises information that describes which DIMM of the first memory device is associated with the fatal memory link error and is to be replaced.

7. The information handling system of claim 1, wherein the fatal memory link error comprises one of a persistent uncorrectable command error or a persistent uncorrectable address error.

8. A method, comprising:
issuing, by an integrated memory controller (IMC), write transactions to both a first memory device and a second memory device of the IHS when the IMC is in memory mirroring mode;
issuing, by the IMC, read transactions to the first memory device when the IMC is in memory mirroring mode;
transmitting, by the IMC, a system management interrupt (SMI) with an IMC error to a basic input/output system (BIOS) of the IHS when a persistent uncorrected IMC error is detected within the first memory device;
receiving, by the BIOS, the SMI with the IMC error from the IMC;
determining whether i) the IMC is in the memory mirroring mode and ii) the IMC error is a fatal memory link error;
in response to determining that i) the IMC is not in the memory mirroring mode and ii) the IMC error is a fatal memory link error, transmitting, by the BIOS, a machine check error (MCE) interrupt with an uncorrectable error to an operating system (OS) of the IHS;
in response to determining that i) the IMC is in the memory mirroring mode and ii) the IMC error is a fatal memory link error: a) performing, by the BIOS, a memory mirror failover process to cause the IMC to issue the write transactions and the read transactions to the second memory device, and b) transmitting, by the BIOS, a system control interrupt (SCI) with a memory redundancy lost event to the OS of the IHS independent of transmitting the MCE interrupt to the OS of the HIS.

9. The method of claim 8, wherein the memory mirror failover process to further cause the IMC to quiesce any outstanding write and read transactions to the first memory device.

10. The method of claim 8, wherein the first memory device and the second memory device comprise dual in-line memory modules (DIMMs).

11. The method of claim 8, wherein the information handling system further comprises:
a first memory channel coupled between the IMC and the first memory device; and
a second memory channel coupled between the IMC and the second memory device.

12. The method of claim 8, wherein the information handling system further comprises:
a first memory channel coupled between the IMC and the first memory device; and
a second memory channel coupled between the IMC and the second memory device, wherein
the IMC communicates with the first memory channel via a first double data rate/double data rate transactional (DDR/DDRT) link, and wherein
the IMC communicates with the second memory channel via a second DDR/DDRT link.

13. The method of claim 8, wherein the memory mirror redundancy lost event comprises information that describes which DIMM of the first memory device is associated with the fatal memory link error and is to be replaced.

14. The method of claim 8, wherein the fatal memory link error comprises one of a persistent uncorrectable command error or a persistent uncorrectable address error.

* * * * *